US005376434A

United States Patent [19]

Ogawa et al.

[11] Patent Number: 5,376,434

[45] Date of Patent: Dec. 27, 1994

[54] PHOTOGRAPHIC MATERIAL COMPRISING PROTECTIVE LAYER AND PREPARING METHOD THEREOF

[75] Inventors: Takahiro Ogawa; Sota Kawakami; Hiroshi Watanabe, all of Hino, Japan

[73] Assignee: Konica Corporation, Japan

[21] Appl. No.: 95,713

[22] Filed: Jul. 21, 1993

[30] Foreign Application Priority Data

Aug. 11, 1992 [JP] Japan .................................. 4-214219

Nov. 17, 1992 [JP] Japan .................................. 4-307052

[51] Int. Cl.[5] ................................................ B32B 3/00

[52] U.S. Cl. .................................... 428/195; 428/205; 428/213; 428/492; 430/627; 430/935

[58] Field of Search ............... 430/628, 634, 635, 935, 430/627; 524/169, 222, 248; 428/195, 211, 913, 914, 411.1, 205, 213, 492

[56] References Cited

U.S. PATENT DOCUMENTS

| | | | |
|---|---|---|---|
| 4,870,001 | 9/1989 | Ashida | 430/538 |
| 4,965,180 | 10/1990 | Suematsu et al. | 430/518 |
| 4,990,435 | 2/1991 | Vallarino et al. | 430/546 |
| 5,126,226 | 6/1992 | Fröhlich et al. | 430/257 |
| 5,179,147 | 1/1993 | Jones | 524/261 |
| 5,208,139 | 5/1993 | Ishigaki | 430/523 |
| 5,210,001 | 5/1993 | Fröhlich et al. | 430/252 |
| 5,227,285 | 7/1993 | Hattori et al. | 430/534 |
| 5,266,455 | 11/1993 | Jones | 430/536 |

FOREIGN PATENT DOCUMENTS 0107378 2/1984 European Pat. Off. .

*Primary Examiner*—Patrick J. Ryan

*Assistant Examiner*—William A. Krynski

*Attorney, Agent, or Firm*—Jordan B. Bierman

[57] ABSTRACT

A photographic material and a preparing method thereof are disclosed, the material comprising a photographic print and a protective layer provided on an image layer of the photographic print by coating latex comprising a resin having a glass transition temperature of 30° to 70° C.

5 Claims, No Drawings

PHOTOGRAPHIC MATERIAL COMPRISING PROTECTIVE LAYER AND PREPARING METHOD THEREOF

FIELD OF THE INVENTION

The present invention relates to a photographic material comprising a photographic print and a protective layer provided on an image layer of the photographic print and a preparing method thereof, and more particularly to the photographic material that is excellent in water resisting property, excellent in preventing fingerprints from being left and excellent in prevention of sticking, while keeping portraying texture. It also relates to a method for preparing a photographic material wherein a thermal transfer image formed with a heat-fusible thermal transfer material on a photographic image or on a protective layer is excellent in water resisting property. It further relates to a method for forming an image having high added values (surface-processed image of a folio type).

BACKGROUND OF THE INVENTION

It is widely known that an image layer of a photographic print contains gelatin, and therefore, it is easily affected by water, showing degeneration caused even by few waterdrops, fingerprints stay thereon easily, and sticking of the image layer to another photogaphic print also takes place. Further, even when a thermal transfer image is formed on the image layer of the photographic print by the use of heat-fusible thermal transfer material, the transferred image is caused by waterdrops to come off, which is a problem.

Heretofore, therefore, an image layer has been provided with a protective layer. It is disclosed in Japanese Patent Publication Open to Public Inspection (hereinafter referred to as Japanese Patent O.P.I. Publication) Nos. 201248/1986 and 21150/1987 that radiation hardenable resin is coated and hardened by radiation to beaprotective layer. It is also disclosed in Japanese Patent O.P.I. Publication Nos. 62360/1987 and 259570/1988 that a photographic print is laminated. However, photographic prints obtained through the methods mentioned above are extremely deteriorated in portraying texture.

It is further described in Japanese Patent O.P.I. Publication No. 247370/1987 that a protective resin layer for a photographic print is obtained by coating resin latices, drying and heating them under pressure. However, resin latices are not specified in particular, and heating under pressure is required after coating and drying.

In recent years, in a method for replenishing developing solutions, water and tablets of developing agents (developing agents tableted with water-soluble polymer) are used for replenishing, and replenishment of water for water evaporation as well as ion exchange for unnecessary salts are conducted, so that no waste solutions may be drained out. In this case, water-soluble polymer stays in a photographic print and causes a problem of sticking.

SUMMARY OF THE INVENTION

An object of the invention is to provide a photographic material wherein a water resisting property of a photographic print is improved, fingerprints are prevented from staying on the photographic print, sticking is prevented and a water resisting property of a thermal transfer image formed on a photographic image or on a protective layer is also improved, and a preparing method therefor. A further object of the invention is to provide a method for forming an image having high added values (surface-processed image of a folio type). A still further object of the invention is to provide a method for preparing a photographic print that is free from sticking despite a method for replenishing developing agents in the form of tablets in a developing solution.

DETAILED DESCRIPTION OF THE INVENTION

The objects of the invention mentioned above are achieved by the following constitution.

1. A photographic material comprising a photographic print and a protective layer provided on an image layer of the photographic print by coating latex thereon and drying, said latex comprising a resin having a glass transition temperature of 30° to 70° C.

2. A photographic material comprising a photographic print and a protective layer provided on an image layer of the photographic print by coating latex and drying, said latex comprising at least one first resin having a glass transition temperature of not less than 80° C. and at least one second resin having a glass transition temperature of not less than 0° to 40° C., wherein the arithmetic mean of the glass transition temperatures of said first and second resins is 30° to 70° C.

3. The photographic material as described in the aforementioned Item 1 or 2, wherein the protective layer further comprises wax and/or a matting agent.

4. A method of preparing a photographic material comprising a photographic print and a protective layer provided on an image layer of the photographic print, comprising the steps of transferring thermally a thermal transfer image onto the image layer using a heat-fusible thermal transfer material; and then coating latex on the transferred image to form the protective layer.

5. A method of preparing a photographic material comprising a photographic print and a protective layer provided on an image layer of the photographic print, comprising the steps of coating latex on the image layer, drying the coated latex to form the protective layer; and then transferring thermally a thermal transfer image onto the protective layer using a heat-fusible thermal transfer material.

6. A method of preparing a photographic material comprising a photographic print and a protective layer provided on an image layer of the photographic print, wherein the protective layer described in the aforementioned Item 4 or 5 is the protective layer described in the aforementioned Item 1, 2 or 3.

7. The photographic material described in the aforementioned Item 1, 2 or 6, wherein the photographic material is in the folded shape.

8. The photographic material described in the aforementioned Item 1, 2 or 6, wherein the surface of the protective layer has protrusions and cavities.

9. The photographic material described in the aforementioned Item 1, 2 or 6, wherein the image of the photographic print is a photographic image formed by a method comprising being developed with developer replenished by a tablet containing developing agents.

The protective layer of the invention will be explained first, as follows.

The latex used in the invention comprises a discontinuous phase of resin particles dispersed in an aqueous medium. The resin includes polyethylene, polybutadiene, polychloroprene, polyisoprene, a polyester, polystyrene, a polyacrylate, a polymethacrylate, polyurethane, polyvinylacetate, polyethylacrylate, polyvinylchloride, polyvinylidenechloride, a polyamide, polyvinylpyridine, polyoxymethylene, an alkyd resin, a glyptal resin, an epoxy resin, a phenoxy resin, a phenol resin, a urea resin, a melamine resin and a meleic acid resin or their resins modified by a carboxyl or sufonic acid group. Further, the resin includes a resin having a SiOH group in its side chain which is capable of being crosslinked by drying.

The protective layer of the invention preferably contains a resin having a glass-transition temperature (Tg) within the range from 30° C. to 70° C. When the glass-transition temperature is lower than the above-mentioned level, fingerprints are left and sticking is caused, while, when it is higher than the above-mentioned level on the contrary, cracks are caused. The glass transition temperature of resins varies depending on the factors such as a composition ratio, a polymerization degree and a degree of crystallinity, and it can be obtained by selecting optionally from resin latices available on the market. Two or more kinds of resins each having a glass-transition temperature (Tg) of 30°–70° C. may be used in combination.

The protective layer preferably contains one or more kinds of first resins each having a glass transition temperature of 80° C. or more and one or more kinds of second resins each having a glass transition temperature of 0°–40° C. in combination wherein the arithmetic mean glass transition temperature thereof is 30°–70° C.

The arithmetic mean glass transition temperature Tg is represented by $\Sigma Tg(i) \times A(i)$, wherein Tg of each resin is represented by Tg (i) and a rate of content of each resin is represented by A (i).

It is preferable for a sliding property and a water resisting property both on the surface of a protective layer to be improved that the protective layer contains wax. An added amount of the wax ranging from 1% by weight to 20% by weight is preferable. Heat-fusible substances described later of heat-fusible thermal transfer materials are given as the wax .

It is preferable for the matted surface and prevention of sticking on a protective layer to be improved that the protective layer contains matting agents. The matting agents include inorganic compounds such as $SiO_2$, $BASO_4$, $TiO_2$, BN, alumina, mica and calcium carbonate and particles thereof, or organic compounds such as silicone resin, ethylenetetrafluoride, vinyl chloride and carbon fluoride and particles thereof. The particle size of the matting agents is preferably 0.1–2 μm and the content of the matting agents is preferably 1–10 % by weight.

Coating of resin latices on a photographic print is not limited only to those including gravure coating, roller coating, wire coating, slide hopper coating, sponge coating and spray coating, but the resin latices may also be added in the final stabilizing bath. With regard to drying, hot-air drying at the temperature of 60°–110° C. is preferable. The thickness of a protective layer is 0.1–5 μm, and preferably, 1–3 μm.

The protective layer may be either of a single-layer type or of a multi-layer type of two or more layers in layer construction, and it is preferable to provide resins of lower Tg on the side closer to a photographic print (for improving a film-forming property) and to provide resins of higher Tg on the farther side (for preventing sticking), when the layer is of a type of two or more layers.

As additives to be added to the aforementioned resin latices, dispersing agents, antistatic agents, thermohardening agents, organic solvents in a small amount, pH adjusting agents, coating aid, surface active agents, antiseptic agents, and decoloring agents (nucleophilic reagents, oxidation bleaching agents), for example, may be added.

With regard to pH in a protective layer, when the pH is on the acid side, leuco dye (colorless) remaining in a photographic print is subjected to recoloring and is colored, while when the pH is on the alkaline side, storage stability of an image of the photographic print is affected. Therefore, it is preferable that the pH is adjusted to be in a neutral zone. It is also possible to color freely the protective layer with dyes or pigments.

Next, material construction of heat-fusible thermal transfer materials of the invention will be explained as follows.

The heat-fusible thermal transfer material used in the invention comprises a support and provided thereon, a thermal transfer layer containing a binder and a colorant.

As a support, there may be given various kinds of paper such as, for example, paper, coated paper, or synthetic paper (polypropylene, polystyrene or composite material in which polypropylene or polystyrene is laminated on paper), various kinds of plastic films or sheets such as resin sheet of a vinyl chloride type, ABS resin sheet, polyethyleneterephthalate base film, or polyethylenenaphthalate base film, films or sheets formed by various kinds of metals and films or sheets formed by various kinds of ceramics, The thickness of the support is usually within a range of 1–10 μm.

A thermal transfer layer is composed of a colorant and a binder, as well as, if necessary, of various kinds of additives (antistatic agents, plasticizers, heat-fusible substances, surface active agents, matting agents, metallic fine grains, etc.). When the thermal transfer layer is of a multi-layer type of two or more layers, a layer or layers containing no colorant may be included.

The colorant mentioned above includes, for example, pigments such as inorganic pigments and organic pigments as well as dyes.

As inorganic pigments, there may be given, for example, titanium dioxide, carbon black, zinc oxide, Prussian blue, cadmium sulfide, iron oxide, lead chromate, zinc chromate, barium chromate and calcium chromate.

The organic pigment includes, for example, azo, thioindigo, anthraquinone, anthanthrone or tripheno-dioxazine pigment, vat dye pigment, phthalocyanine pigment (for example, copper phthalocyanine) or a derivative thereof and quinacridone pigment.

As organic dyes, acid dyes, direct dyes, disperse dyes, oil soluble dyes and metal-containing oil soluble dyes, for example, may be given.

The content of colorants in a thermal transfer layer is not limited in particular, but it is usually within a range of 5–70 % by weight and it is preferably within a range of 10–60% by weight.

As a binder, a thermoplastic resin is preferably used.

The thermoplastic resin includes, resins such as an ethylene copolymer, a polyamide resin, a polyester resin, a polyurethane resin, a polyolefin resin, an acryl resin, a vinylchloride resin, a cellulose resin, a rosin resin, a polyvinylalcohol resin, a polyvinylacetal resin, an ionomer resin and a petroleum resin, elastomers such as natural gum, styrene-butadiene gum, isoprene gum, chloroprene gum and a diene copolymer, rosin derivatives such as ester gum, rosin-maleic acid resin, rosin-phenol resin and hydrogenated rosin, and polymers such as a penol resin, a terpene resin, a cycopentadiene resin and an aromatic hydrocarbonate resin.

Through appropriate selection from the thermoplastic substances mentioned above, it is possible to form a thermal transfer layer having the desired softening point or the desired melting point.

Among various kinds of additives used as occasion demands, carbon black, aluminum, and iron, for example, can be used as an antistatic agent, while, anionic, cationic, amphoteric or nonionic surface active agents which are known widely can be used as a surface active agent.

The plasticizer includes phthalic acid esters such as dimethyl phthalate, dioctyl phthalate and didecyl phthalate, trimellitic acid esters such as octyl trimellitate, isononyl trimellitate and isodecyl trimellitate, pyromellitic acid esters (for example, octyl pyromellitate), adipic acid esters such as dioctyl adipate and methyllauryl adipate, oleic acid esters, succinic acid esters, maleic acid esters, cebatic acid esters, citric acid esters, epoxidated soybean oil, epoxidated linseed oil, phosphoric acid esters such as triphenyl phosphate and tricresyl phosphate, phosphorous acid esters such as triphenyl phosphite, tridecyl phosphite and dibutyl hydrogen phosphite, glycol esters.

The heat-fusible substance includes vegetable waxes such as carnauba wax, Japan wax, and , animal waxes such as bees wax, insect wax, shellac wax and spermaceti, petroleum waxes such as paraffin wax, microcrystalline wax, polyethylene wax, ester wax and acid wax, mineral waxes such as montan wax, ozocerite and ceresine, higher fatty acids such as palmitic acid, stearic acid, margaric acid and behenic acid, higher alcohols such as palmityl alcohol, stearyl alcohol, behenyl alcohol, margaryl alcohol, myricyl alcohol and eicosanol, higher fatty acid esters such as cetyl palmitate, myricyl palmitate, cetyl stearate and myricyl stearate, amides such as acetic amide, propionic amide, palmitic amide, stearic amide and amide wax, higher fatty amines such as stearyl amine, behenyl amine and palmityl amine.

As a matting agent, there may be given titanium white, calcium carbonate, zinc oxide, barium sulfate, silica, talk, clay, kaolin, activated clay, acid clay, fluorine-contained resin particles, anamineresin particles, acrylic acid resin particles and silicone resin particles.

As metallic fine grains, aluminum powder, iron powder and others may be given.

It is preferable that the thickness of the thermal transfer layer is within a range of 0.5–5.0 μm, and it is more preferable that the thickness is within a range of 1.0–3.0 μm.

A fusion-prevention layer provided preferably on the reverse side of a support improves a heat resisting property required for the contact with a thermal head. Appropriate materials for the fusion-prevention layer include silicone resins, fluorine-contained resins, polyimide resins, epoxy resins, phenol resins, melamine resins, acrylic resins, nitrocellulose and others. The thickness of the fusion-prevention layer ranging from 0.1 μm to 1.0 μm is preferable, and that of 0.2–0.5 μm is more preferable.

A peeling layer provided preferably between the support and a thermal transfer layer will be explained as follows.

A peeling layer is provided so that a layer (generally, a thermal transfer layer wherein colorants are contained in at least one layer thereof) provided on the peeling layer may be peeled quickly and transferred. The peeling layer is structured, containing heat-fusible substances suitable for achieving the object mentioned above, as a layer wherein properties of the heat-fusible substance dominate, especially as a layer excellent in peeling property.

The peeling layer may be structured with a thermal transfer substance itself, but usually, it is structured preferably with heat-fusible substances and/or binder resins such as thermoplastic resins (stated above as a binder for thermal transfer). Further, there may be given silicone compounds having peeling property such as, for example, polyester-denatured silicone resins (or, silicon-denatured polyester resins), acryl-denatured silicone resins (or, silicon-denatured acrylic resin), urethane-denatured silicone resins (or, silicon-denatured urethane resins), cellulose-denatured silicone resins (or silicon-denatured cellulose resins), alkyd-denatured silicone resins (or, silicon-denatured alkyd resins), and epoxy-denatured silicone resins (or, silicon-denatured epoxy resins).

The thickness of the peeling layer ranging from 0.1 μm to 2.0 μm is preferable, and that of 0.3–1.0 μm is more preferable.

Each layer mentioned above may be coated through a known coating method such as a gravure coating method, a wiper coating method, or a curtain coating method.

A heat-fusible thermal transfer method employing the thermal transfer material of the invention is the same as an ordinary thermal transfer recording method. The heat-fusible thermal transfer method wherein a thermal head is used as a heat source will be explained below as a typical example.

First, a thermal transfer layer of a thermal transfer material is brought into close contact with the image layer surface of a photographic material or with the surface of a protective layer thereof, and then heat pulses are applied by a thermal head to the side opposite to the thermal transfer layer of the thermal transfer material, while, if necessary, the pressure is being applied by a platen to the side opposite to the image layer, thus, the thermal tansfer layer corresponding to the desired printing or the transfer pattern can be heated partially. Thereby, the temperature on the heated portion of the thermal transfer layer rises and the heated portion is softened quickly and transferred onto the image layer or onto the protective layer. When a protective layer is provided on or under th thermally transferred image, a water resisting property of the thermally transferred image is improved.

A method for forming an image on a photographic print of the photographic material or on a protective layer thereof includes, in addition to the aforementioned thermal transfer method, a method for forming an image by the use of an ink jet printer and a method for forming an image by the use of an electrophotographic method, too. A method wherein heat-fusible solid ink is fused by heat and then is jetted from a nozzle is preferably applied to an ink jet printer used in the invention. Owing to this method, it is possible to print satisfactorily on a photographic print, and it is further possible to print, at a level of printing quality identical to that for an ordinary photographic print, even on a photographic print whose surface is highly rough and has protrusions and cavities like a silk surface. For an electrophotographic method used in the invention, on the other hand, an ordinary method may be employed. For example, a digital printer using an electrophotographic process such as a laser printer or an LED printer may be used.

Next, post processing for the image layer provided with a protective layer will be explained as follows.

In recent years, there has been a demand for a postal card such as an invitation card, for example, which is of a type of a folio. In this case, when an ordinary protective coat is not provided on an image layer, the image surfaces of the folio stick to each other The invention is useful for a folio type post cards mentioned above.

It is also possible to raise an added value by providing protrusions and cavities on the protective layer by means of embossing treatment. The surface of the protective layer preferably has a center line average roughness of 3 to 50 μm.

EXAMPLES

There will be given examples of the invention as follows to which the invention is not limited.

Example 1

A photographic paper (Konicacolor Type QA; made by Konica) was subjected to imagewise exposure and then was processed, thus a photographic print was prepared. Each of the resin latices described below was coated through wire bar on the photograpic print thus obtained, and then dried by hot air at 100° C. to give a 2 μm thick protective layer, thus samples were prepared.

Sample No. 1 (comparative)

No resin latex provided.

Sample No. 2 (comparative)

TK set 113B Tg=20° C. polyester (made by Takamatsu Yushi)

Sample No. 3 (comparative)

Pesresin A- 515G Tg=75° C. polyester (made by Takamatsu Yushi)

Sample No. 4 (present invention)

Pesresin A - 814G2 Tg=60° C. polyester (made by Takamatsu Yushi)

Sample No. 5 (present invention)

Pesresin A- 1243 Tg=60° C. polyester (made by Takamatsu Yushi)

Sample No. 6 (present invention)

HYTEC S8532 Tg=32° C. polyethylenepolyurethane (made by Toho Kagaku Kogyo)

Sample No. 7 (present invention)

Yodosol GD902 Tg=40° C. styreneacrylic acid copolymer (made by Kanebo NSC)

Sample No. 8 (present invention) Julimer FC-65 Tg=60° C. polyacrylate (made by Nihon Junyaku )

Sample No. 9 (present invention)

Yodosol GD901 Tg=20° C. percentage 50% styreneacrylic acid copolymer (made by Kanebo NSC)

Yodosol GD903 Tg=90° C. percentage 50% styreneacrylic acid copolymer (made by Kanebo NSC)

Tg 55° C. in arithmetic mean

Sample No. 10 (present invention)

Yodosol GD901 Tg=20° C. percentage 35% styreneacrylic acid copolymer (made by Kanebo NSC)

Yodosol GD903 Tg=90° C. percentage 65% styreneacrylic acid copolymer (made by Kanebo NSC)

Tg 65.5° C. in arithmetic mean

Sample No. 11 (present invention)

Yodosol GD901 Tg=20° C. percentage 80% styreneacrylic acid copolymer (made by Kanebo NSC)

Yodosol GD903 Tg=90° C. percentage 20% styreneacrylic acid copolymer (made by Kanebo NSC)

Tg 34° C. in arithmetic mean

Sample No. 12 (comparative)

Yodosol GD901 Tg=20° C. percentage 15% styreneacrylic acid copolymer (made by Kanebo NSC)

Yodosol GD903 Tg=90° C. percentage 85% styreneacrylic acid copolymer (made by Kanebo NSC)

Tg 79.5° C. in arithmetic mean

Sample No. 13 (comparative)

Yodosol GD901 Tg=20° C. percentage 90% styreneacrylic acid copolymer (made by Kanebo NSC)

Yodosol GD903 Tg=90° C. percentage 10% styreneacrylic acid copolymer (made by Kanebo NSC)

Tg 27° C. in arithmetic mean

Each sample was evaluated by the method shown below.

[Water resisting property]

Each sample was dipped in water for one hour, and then the surface of the photographic print was subjected to visual check and the degree of swelling was evaluated.

A: No swelling was observed.

B: Swelling caused by a crack of the protective layer was observed.

C: Swelling was observed.

[Fingerprint-holding property]

Each sample was pushed by a finger, and fingerprints leaving on the pushed part on the sample were observed for evaluation.

A: No fingerprints left.

C: Fingerprints left.

[Crack]

Cracks of the protective layer were observed for evaluation.

A: No crack was observed.

C; Cracks were observed.

[Sticking]

Two samples having the same constitution were superposed so that the protective layer surfaces may face each other, and a load of 100g/cm$^2$ was applied thereto for three days under the conditions of 40° C. and 80% RH for evaluation of sticking property.

A: No sticking was observed.

B; Slight sticking was observed, but samples could be separated.

C. Samples stuck, and could not be separated. [Water resisting property of thermal transfer images]

The protective layer was subjected to printing conducted by a word-processor (RUPO 88F, made by Toshiba) employing an ink ribbon (Type H, made by Toshiba), and its thermal transfer portion was dipped in water for ten minutes and then was rubbed.

A: Thermal transfer images did not come off.

B: Thermal transfer images came off partially.

C: Thermal transfer images came off.

The results are shown in the following Table.

TABLE 1

| | Evaluation results | | | | |
|---|---|---|---|---|---|
| Sample No. | Water resisting property | Fingerprint-holding property | Crack | Sticking property | Water resisting property of thermal transfer images |
| 1 (Comparative | C | C | A | C | C |

TABLE 1-continued

| Sample No. | Evaluation results: Water re-sisting prop-erty | Finger-print-holding prop-erty | Crack | Stick-ing prop-erty | Water resisting property of thermal transfer images |
|---|---|---|---|---|---|
| example) | | | | | |
| 2 (Comparative example) | B | C | A | C | B |
| 3 (Comparative example) | B | A | C | A | B |
| 4 (Present invention) | A | A | A | B | A |
| 5 (Present invention) | A | A | A | A | A |
| 6 (Present invention) | A | A | A | B | A |
| 7 (Present invention) | A | A | A | A | A |
| 8 (Present invention) | A | A | A | A | A |
| 9 (Present invention) | A | A | A | A | A |
| 10 (Present invention) | A | A | A | A | A |
| 11 (Present invention) | A | A | A | A | A |
| 12 (Comparative example) | B | A | C | A | B |
| 13 (Comparative example) | B | C | A | C | B |

As is apparent from the evaluation results, when a protective layer of a photographic print is made of a resin latex whose a glass transition temperature or an arithmetic mean thereof is 30°–70° C., an improvement in water resisting property as well as prevention of fingerprints and sticking can be realized without any deterioration of portraying texture of photographic prints, and the water resisting property of thermal transfer images formed on the protective layer can also be improved.

[Example 2]

Polyethylene wax (B-1309 made by Toho Kagaku) was added in quantity of 10% by weight to the resin latex coating solutions of Sample Nos. 4 and 10 in Example 1. The Sample Nos. 4 and 10 were inferior in sliding property, and showed devitrification when rubbed with tissue paper. However, the above-mentioned samples which polyethylene wax was added to showed no devitrification even when rubbed with tissue paper, and indicated an improved sliding property.

The same effects as in the foregoing were also obtained when paraffin wax, microcrystaline wax or a palmitate was added instead of the polyethylene wax.

[Example 3]

It was possible to mat by adding silicone resin matting agents (TOSPAL 108 made by Toshiba Silicone) in quantity of 5% by weight to resin latex coating solutions with Sample Nos. 4 and 6 in Example 1. Further, an improvement in sticking was also observed when the aforementioned matting agents were added to Sample Nos. 4 and 6.

[Example 4]

In the Example 1 mentioned above, thermal transfer images were formed on a photographic print, and then a protective layer was provided. The evaluation identical to that in the foregoing was conducted. The results showed the effects of the invention.

[Example 5]

A photographic print sample in Example 1 was folded so that the photographic print surface having thereon a protective layer may be brought into contact with each other, and the protective layer proved to be excellent, showing neither cracks nor sticking phenomenon.

[Example 6]

A photographic print surface provided with a protective layer of the invention in Example 1 was subjected to embossing treatment which formed clear protrusions and cavities on the photographic print surface. On a photographic print having thereon no protective layer, on the other hand, clear protrusions and cavities were not formed.

[Example 7]

Photographic prints were prepared through the processing method wherein tablets (processing agent for each solution tableted with polyethylene glycol) and water were used in a method for replenishing a color developing solution, a bleach-fix and a stabilizing solution.

The level of sticking of photographic prints having thereon no protective layer obtained in Example 1 was slight in the evaluation under mild condition standing for 3 days at a temperature of 30° C. and a relative humidity of 60% RH and a testing period of 3 days, and the photographic prints could be separated. However, photographic prints prepared through the above-mentioned tablet-replenishing method stuck to each other and could not be separated.

It was possible to prevent sticking of photographic print prepared through the aforesaid tablet replenishing methods, by providing the protective layer of the invention in Example 1.

Example 8

Samples were obtained in the same manner as in Example 4 except that an image was formed on a photographic print by the use of an ink jet printer wherein solid ink was fused by heat and was jetted from a nozzle, instead of forming the thermal transfer image on a photographic print.

These samples were subjected to evaluation identical to that in Example 1, and the effects of the invention were obtained.

Example 9

Samples were obtained in the same manner as in Example 4 except that an image was formed on a photographic print by the use of an electrophotographic process, instead of forming the thermal transfer image on a photographic print.

These samples were subjected to evaluation identical to that in Example 1, and the effects of the invention were obtained.

The results mentioned above show that the present examples are excellent.

What is claimed is:

1. A photographic material comprising a photographic print, said material having a gelatin-containing layer bearing an image, and a protective layer formed on said gelatin-containing layer by coating latex and drying, said protective layer having a thickness of 0.1 to 5.0 μm, said latex comprising at least one first resin having a glass transition temperature of not less than 80° C., and at least one second resin having a glass transition temperature of 0° C. to 30° C., wherein an arithmetic mean of the glass transition temperatures of said first resin and said second resin is 30° C. to 70° C.

2. The photographic material of claim 1, wherein said protective layer further comprises wax.

3. The photographic material of claim 1, wherein said protective layer further comprises a matting agent.

4. The photographic material of claim 1, wherein said protective layer is subjected to an embossing treatment.

5. A photographic material comprising a photographic print, said material having a gelatin-containing layer bearing an image, and a protective layer provided on said gelatin-containing layer of said photographic print by coating latex and drying, said protective layer having a thickness of 0.1 to 5.0 μm, said latex comprising a resin having a glass transition temperature of 30° C. to 70° C.

* * * * *